Dec. 12, 1961 H. H. CARY 3,013,194

SERVOSYSTEM

Filed Jan. 22, 1958 2 Sheets-Sheet 1

HENRY H. CARY,
INVENTOR.

BY [signature]
ATTORNEY.

Dec. 12, 1961 H. H. CARY 3,013,194

SERVOSYSTEM

Filed Jan. 22, 1958 2 Sheets-Sheet 2

HENRY H. CARY,
INVENTOR.

BY [signature]
ATTORNEY.

United States Patent Office 3,013,194

Patented Dec. 12, 1961

3,013,194

SERVOSYSTEM

Henry H. Cary, Alhambra, Calif., assignor to Applied Physics Corporation, Pasadena, Calif., a corporation of California Filed Jan. 22, 1958, Ser. No. 710,442
19 Claims. (Cl. 318—28)

This invention relates to an improved servo-mechanism.

One object of this invention is to provide an improved servo-mechanism in which an increased signal-to-noise ratio is obtained.

Another object of this invention is to provide an improved servo-mechanism in which the response characteristic is higher than the second order.

Another object of the invention is to provide a servo-mechanism in which the response time may be adjusted without affecting the magnitude of the backlash, or dead zone.

Another object of the invention is to provide a servo-mechanism having a response time that is variable over a wide range with means for adjusting the response characteristic for a plurality of response times in that range while still permitting the response time to be varied easily throughout the range.

Another object of the invention is to provide a servo-mechanism having a response characteristic of second or higher order which characteristics may be varied by changing only two variable resistors.

Another object of the invention is to provide a multiple-loop servo-mechanism having the characteristics mentioned above and which is stable throughout a wide range of response times.

In accordance with this invention, the foregoing and other objects are achieved in a multiple-loop servomechanism by employing a first low-pass filter externally of a minor loop and a second low-pass filter within the minor loop. Additionally, means are provided for varying other characteristics of the system. The minor loop feedback circuit and the two filters are ganged together so that the response time may be varied simultaneously in such a way as to maintain approximately optimal damping characteristics throughout a wide range of response time.

The manner in which the foregoing and other objects of the invention are obtained may be understood by reference to the following description of two embodiments of the invention which are illustrated in the accompanying drawings, in which.

Figure 1:
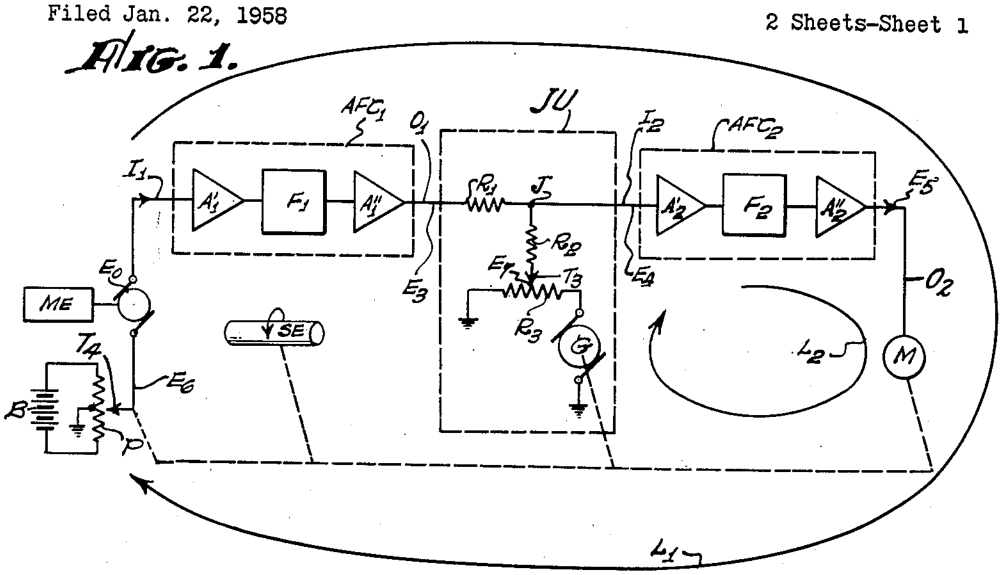
FIGURE 1 is a block diagram of a D.C. servo-mechanism embodying this invention.

Referring to the drawings, and more particularly to FIGURE 1, there is illustrated a multiple-loop servo-mechanism which is provided with a higher-than-second-order response characteristic in accordance with this invention. All the components of this system are D.C. (direct current) components. In this system, a master element ME is employed to generate a master input signal voltage $E_0$. This signal is impressed upon the input of the major loop $L_1$ which cooperates with the minor loop $L_2$ in such a way as to generate an output voltage $E_6$ which is balanced against the input voltage $E_0$ and which simultaneously drives a slave element SE. It is characteristic of such a system that the position or other condition of the slave element is a single-valued function of the input signal.

In order to attain the higher-than-second-order response, two low-pass filters $F_1$ and $F_2$ are employed. The first low-pass filter $F_1$ is included only in the first, or major, loop, being located between the input $I_1$ of this loop and the input $I_2$ of the second, or minor, loop. The second low-pass filter $F_2$, however, is included only in the second loop, being located between its input $I_2$ and the output $O_2$.

Amplifier $A_1'$, low-pass filter $F_1$, and amplifier $A_1''$ are connected in the sequence mentioned between the input $I_1$ and the input $I_2$. The amplifiers $A_1'$, low-pass filter $F_1$, and the amplifier $A_1''$ form a first amplifier-filter channel $AFC_1$. Amplifier $A_2'$, a second low-pass filter $F_2$, and the amplifier $A_2''$ are connected in the order named between the input $I_2$ of the second loop and the output $O_2$ of the system. The amplifier $A_2'$, filter $F_2$, and amplifier $A_2''$ together form a second amplifier-filter channel $AFC_2$. A potential divider comprising resistors $R_1$ and $R_2$ is connected between the output $O_1$ of the first amplifier filter channel $AFC_1$ and the input $I_2$ of the second amplifier filter channel $AFC_2$.

The signal appearing at the output $O_2$ is employed to drive a motor M, such as a series motor, which is accelerated by the output signal. The motor M is connected to operate a rate generator G, the slave element SE, and also to move a sliding contact $T_4$ of a potentiometer P for establishing the input balancing voltage $E_6$ at the value required to balance the input voltage $E_0$. The motor M and generator G are mounted on the same shaft, and their rotors have a low value of moment of inertia.

The generator G is of a type which produces at its output a voltage which is proportional to the speed of rotation of the driving motor M. A sliding contact $T_3$ on a potentiometer $R_3$ connected across the output of the generator is set at a point suitable for establishing a voltage $E_7$ which is applied to one end of the potential divider $R_1$ $R_2$ in order to balance that part of the voltage $E_3$ generated by the first amplifier-filter channel $AFC_1$ that is applied to the second amplifier filter channel $AFC_2$. By suitable connections to the generator G the polarity of the generator voltage $E_7$ is made opposite to that of the voltage $E_3$ so that when these two voltages are both acting, the voltage of the junction J between the two resistors $R^1$ and $R_2$ is substantially zero. The part of the circuit comprising the resistors $R_1$ and $R_2$, potentiometer $R_3$, and generator G are hereinafter sometimes referred to as a junction unit JU.

The potential divider $R_1R_2$ acts, in effect, as an adder in which a voltage $E_3$ of one polarity and a voltage $E_7$ of opposite polarity are added together algebraically to produce a nearly zero output at the junction J.

The master element ME and the slave element SE may assume many different forms. In one case the master element ME may be a Raman spectrograph which generates an electrical output proportional to the intensity of radiation of selected wave-length striking a phototube. In such a case the slave element SE may be in the form of a moving pen of a recorder. The master element ME may also be a mass spectrometer which generates an electrical output that depends upon the intensity of an ionic beam transmitted from an ionization chamber to a target electrode. In such a case, too, the slave element SE may be in the form of a pen or other movable element of a recorder. The master element ME may also be in the form of an early warning radar system, which generates an electrical output depending upon the appearance of an object within its horizon. In this case the slave element SE may be in the form of a voltage generator that controls either the displacement or the intensity of an electron beam of a cathode ray oscilloscope.

The master element may, in fact, be any type of device which produces a signal that varies as a function of time. But in the most important fields to which the invention applies, the master element is one in which the signal is produced by a scanning process, and in which the scanning rate may be altered without changing the general shape of the signal except for a change in the time scale.

In any case, highly reliable and accurate control of the slave element SE is achieved by the use of the two low-pass filters $F_1$ and $F_2$ in accordance with this invention. By use of such filters, increased signal-to-noise ratio is achieved. At the same time, as explained hereinafter, approximately optimal damping can be attained, thus providing a system having very rapid response without excessive overshooting. The damping achieved with this invention is more effective than that obtained in a second-order system in that the knee of the response curve is sharper near the final value. Furthermore, in accordance with this invention the two filters may be adjusted to vary the response period of the system to alter the signal-to-noise ratio. At the same time the amount of generator signal fed back in the minor loop may be adjusted and the attenuation of the loop at the high frequencies also adjusted to provide a system that operates satisfactorily over a wide range of response periods.

In the specific embodiment of the invention schematically illustrated in FIGURE 1, the amplifier sections $A_1''$ and $A_2'$ isolate the filters $F_1$ and $F_2$ from the potential divider $R_1R_2$ and from each other. In such a case, the mathematical analysis of the system is greatly simplified. However, the practical benefit of the invention may be achieved without the use of such isolation amplifiers.

Figure 2:
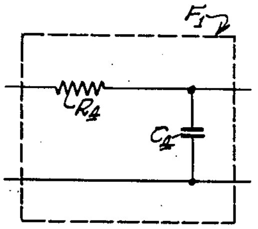
FIG. 2 is a wiring diagram of a low-pass filter employed in the servo-mechanism of FIG. 1.
Figure 3A:
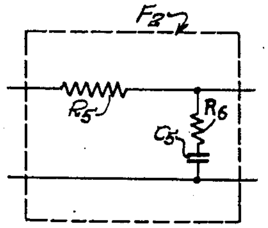
FIG. 3A is a wiring diagram of a second filter employed in the servo-mechanism of FIG. 1.
Figure 3B:
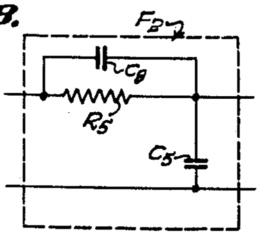
FIG. 3B is a wiring diagram of an alternative form of filter.

In one embodiment of the invention which may be relatively easily analyzed, the amplifiers $A_1'$, $A_1''$, $A_2'$, and $A_2''$ are D.C. amplifiers and the filters $F_1$ and $F_2$ are simple RC networks. More particularly, the first low-pass filter $F_1$ may be of the form illustrated in FIGURE 2 in which a resistor $R_4$ and a capacitor $C_4$ are connected in series across the input, and the output is taken across the capacitor $C_4$. Similarly, as shown in FIGURE 3A, the second low-pass filter $F_2$ may be of a type in which the resistor $R_5$, a resistor $R_6$, and a capacitor $C_5$ are connected in series across the input, and the output is taken across the resistor $R_6$ and the capacitor $C_5$. A low-pass filter as shown in FIGURE 3B may also be employed as the second filter. Furthermore, in accordance with this invention, the values of the resistors $R_4$, $R_5$, and the generator output potentiometer $R_3$ are varied together in such a way as to vary the time constant of the over-all system without introducing overshooting or underdamping of the servo-mechanism.

To help explain the nature of this invention, consider an embodiment of the invention in which the filter circuits have properties defined by the following equations:

$$F_1=\frac{1}{\tau_1 p+1} \qquad (1)$$

where $F_1$ is the response function, or transmission characteristic, of the first low-pass filter $F_1$, and $$F_2=\frac{1}{\tau_2 p+1} \qquad (2)$$

where $F_2$ is the response function, or transmission characteristic, of the second low-pass filter $F_2$. In these equations, $\tau_1$ and $\tau_2$ are the time constants of the filters $F_1$ and $F_2$.

In Equation (2) the effect of resistor $R_6$ on the characteristics of the filter $F_2$ has been neglected. In effect, this amounts to assuming that $\tau_3$ is small compared to $\tau_2$ where $\tau_3$ is the time constant corresponding to the resistor $R_6$ and the capacitor $C_5$ taken alone. Some of the effects that would be produced if $\tau_3$ were not neglected are taken into account hereinafter.

$A_1$ and $A_2$ are the amplification factors of the amplifier channels $AFC_1$ and $AFC_2$, assuming that the filters $F_1$ and $F_2$ have unity transmission coefficients at all frequencies.

The following physical constants are also involved:

$$\frac{k_5}{A^2}=p^2\theta/E_5=\text{a characteristic of the motor} \qquad (3)$$

$$k_6=E_6/\theta=\text{a characteristic of the potentimometer P} \qquad (4)$$

$$k_7=p\theta/E_7=\text{a characteristic of the generator} \qquad (5)$$

In these equations, $\theta$=angular rotation of the motor shaft from a reference position in which $E_6=0$, and $p$=the differential operator $d/dt$ From the foregoing terms the following parameters:

$$g_1=\frac{1}{A_1k_6k_7} \qquad (6)$$

$$g_2=\frac{2}{A_1k_5k_6} \qquad (7)$$

can be formed. These parameters apply when the potential divider $R_1R_2$ is composed of two equal resistors $R_1$ and $R_2$ and the characteristics of the second loop $L_2$ are such that its time constant is short compared with the time constant of the filter $F_2$.

With a system designed to meet the foregoing specifications, it can be shown that the displacement of the motor shaft $\theta$ from a position corresponding to zero input signal is related to the input voltage $E_0$ by the following equation:

$$\frac{\theta}{E_0}=\frac{1}{k_6}\left(\frac{1}{1+pg_1+p^2(\tau_1g_1+g_2)+p^3(\tau_1+\tau_2)g_2+p^4\tau_1\tau_2g_2}\right) \qquad (8)$$

The foregoing equation can be converted to the form $$\frac{\theta}{E_0}=\frac{1}{k_6(\tau p+1)^4} \qquad (9)$$

by selecting the constants of the system in such a way that $$g_1=4\tau \qquad (10)$$

$$\tau_1g_1+g_2=6\tau^2 \qquad (11)$$

$$(\tau_1+\tau_2)g_2=4\tau^3 \qquad (12)$$

$$\tau_1\tau_2g_2=\tau^4 \qquad (13)$$

Such a condition may be achieved by making the time constants $\tau_1$ and $\tau_2$ of the two filter circuits $F_1$ and $F_2$ equal to one-half the time constant $\tau$ of the quartic Equation 9. To satisfy Equations 10, 11, 12, and 13 for any particular value of $\tau$, it is necessary to select particularly related values of $A_1$, $A_2$, $k_5$, $k_6$, and $k_7$. Equation 8 can be converted to the form $$\frac{\theta}{E_0}=\frac{1}{k_6(\tau p+1)^2} \qquad (14)$$

by making $g_2$ very small and by selecting constants in such a way that $$g_1=4\tau_1 \qquad (15)$$

This condition is also satisfied if $\tau_1$ equals one-half the time constant $\tau$ of the quadratic Equation 14. Critical damping is achieved by satisfying either Equation 9 or Equation 14.

An examination of Equation 9 leads to the conclusion that if Equation 9 is satisfied for a given noise bandwidth, the system of FIGURE 1 attains equilibrium more rapidly than an ordinary critically damped system characterized by the same time constant $\tau$. Furthermore, the use of the two filters $F_1$ and $F_2$ serves to increase the signal-to-noise ratio of the shaft position $\theta$ and the voltage $E_6$.

In a practical case, there is some danger that the minor loop $L_2$ will oscillate. Such oscillation is prevented by the employment of the resistor $R_6$. The use of such a resistor, in effect, limits the phase shift in the minor loop in such a way that the amplification $A_2$ of the second amplifier filter channel $AFC_2$ may be increased without oscillation at high frequencies. The danger of introducing oscillation or other instability is obviated by the presence of the resistor $R_6$, partly because of the fact that at high frequencies the filter $F_2$ possesses a nearly zero phase shift characteristic.

A similar effect can be obtained with the filter of FIGURE 3B. In this case, the capacitor $C_8$ that shunts the resistor $R_5$ has the same anti-oscillation effect as the resistor $R_6$ in series with the capacitor $C_5$.

Figure 4A:
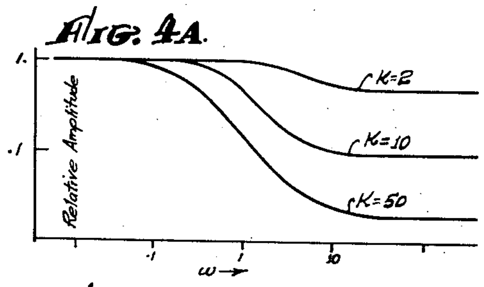
FIGS. 4A and 4B represent respectively the phase vs. frequency, and the amplitude vs. frequency, characteristics of the filters illustrated in FIGURES 3A and 3B.
Figure 4B:
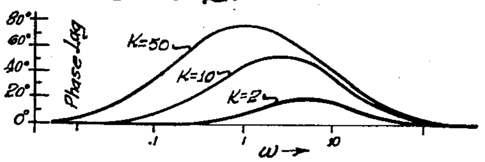

The transmission characteristics of these filters are represented in FIGURES 4A and 4B where $$K=\frac{R_5+R_6}{R_6}\frac{C_7+C_8}{C_8} \tag{16}$$

As indicated by FIGURE 4B, the phase lag introduced by filter $F_2$ is maintained less than 90° by the use of the resistor $R_6$ and the capacitor $C_8$ of the two filters of FIGURES 3A and 3B.

The phase lag introduced by the rate generator G and motor M is about 90°. Accordingly, with such a filter, the total phase lag in the minor loop is maintained less than 180°. By using low values of K, the total phase lag is kept well below 180°. For this reason, even though stray phase shifts may occur in the channel $AFC_2$, there is little danger of oscillation.

In the system described, the slave element SE not only follows the master element ME rapidly but with very little backlash. In this system, the speed of the response varies inversely as the magnitude of the parameter $g_1$. As indicated by Equation 8 this speed depends on the gain $A_1$ of the first amplifier, as well as on other constants which can be independently adjusted. On the other hand, the backlash is determined by the product of the amplifications $A_1$ and $A_2$ of the two channels $AFC_1$ and $AFC_2$ irrespective of the speed of response.

To minimize backlash, the amplification $A_2$ of the channel $AFC_2$ that is included in the minor loop is made as large as possible without introducing instability or oscillation in this loop. The cutoff frequencies of the two filters $F_1$ and $F_2$ are made the same, and they and the potentiometer $R_3$ are varied together to vary the response time and hence the signal-to-noise ratio of the over-all system. When scanning produces a wide range of input signals, a rapid scanning rate is employed with strong signals and a slow scanning rate with weak signals, thus making it possible to attain high signal-to-noise ratio for both strong and weak signals.

Figure 5:
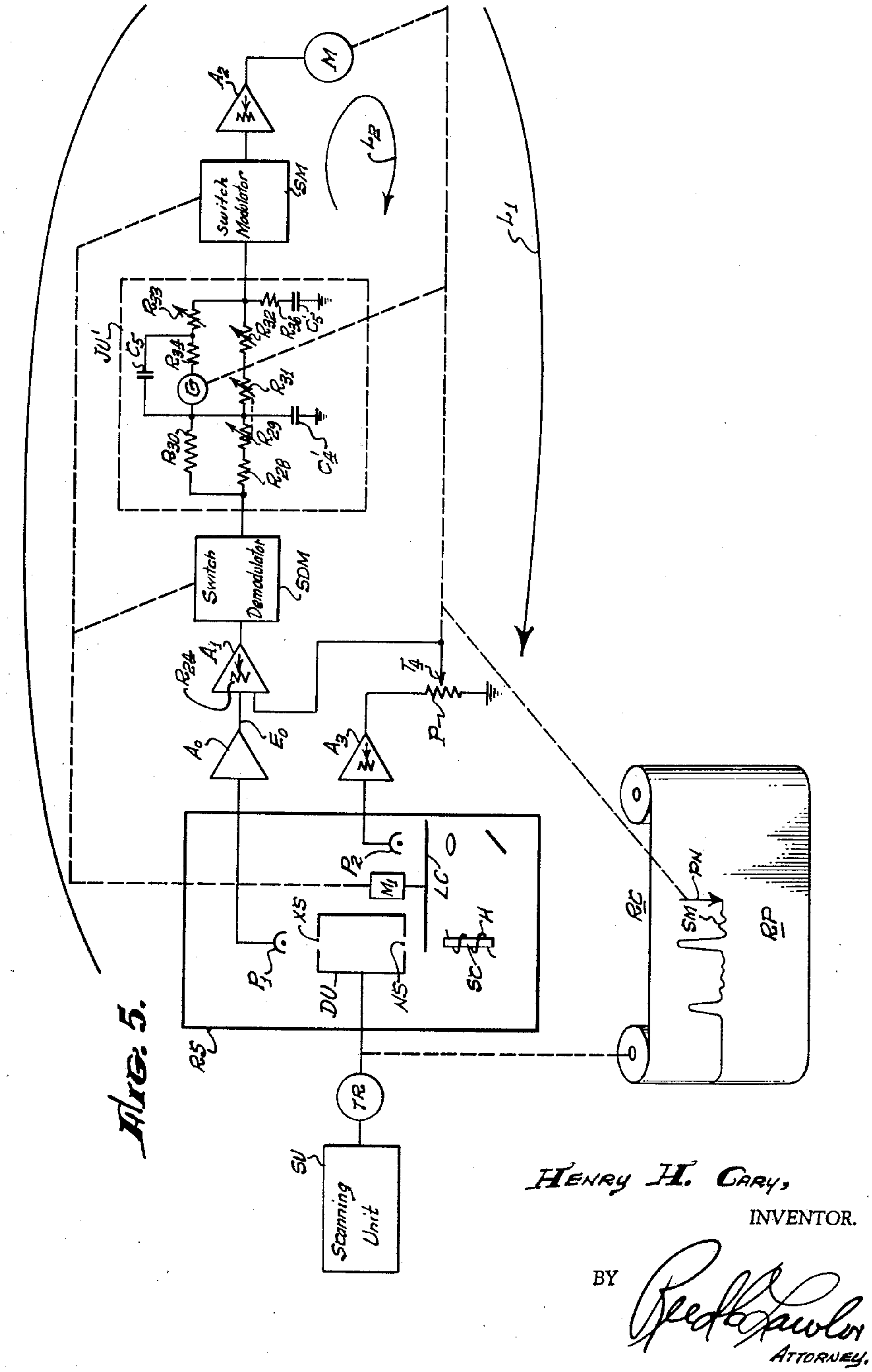
FIG. 5 is a schematic diagram of a servo-mechanism employed in a Raman spectrograph.

In FIGURE 5 there is illustrated an embodiment of the invention, in which the invention is applied to a Raman spectograph RS. In such a Raman spectograph, monochromatic radiation from a source H enters a sample cell SC containing a liquid under investigation. Radiation that is reradiated from the sample is transmitted through a dispersing unit DU to a phototube $P_1$. Radiation from source H is also transmitted directly to a second photocell $P_2$. In order to simplify the design of various electric units which are employed in making measurements with the Raman spectograph, the radiation transmitted to the first photocell P, through the dispersion unit DU and to the second photocell $P_2$ is passed through a light chopper LC that is driven at constant speed by means of an electric motor $M_1$. A scanning unit SU that is connected to the dispersion unit DU through a variable speed transmission TR is employed for scanning the spectrum of radiation emerging from the sample cell SC. Simultaneously, a recorder RC that is operated in synchronism with the dispersion unit DU by connection to the driven end of the transmission TR is employed to draw a strip of record paper past a pen or other recording element PN.

In this arrangement, heterogeneous radiation entering the dispersion unit DU through the entrance slit NS is separated spectrally so that monochromatic radiation of predetermined wave length emerges from the exit slit XS to strike the phototube $P_1$. As the scanning unit SU operates, the wave length of the emerging monochromatic radiation is changed continuously. The intensity of the emerging radiation striking the photocell $P_1$ generates a signal which moves the pen or other recording element PN transversely of the direction of movement of the recording paper, so as to produce a record of the spectrum of the radiation emerging from the sample cell showing how theh intensity of the radiation varies as a function of wave-number or wave-length. A Raman spectrograph of the type to which the present invention may be applied is illustrated and described in Patent No. 2,940,355, issued June 14, 1960, to Henry H. Cary.

In the system illustrated in FIGURE 5, the varying electrical current produced by the phototube $P_1$ is first amplified by a preamplifier $A_0$ and the voltage $E_0$ generated at the output of this amplifier is balanced against a fraction of a reference voltage produced by the second phototube $P_2$. In effect, the voltage generated at the output of the preamplifier $A_0$ corresponds to the voltage $E_0$ supplied by the master element ME of FIGURE 1, and the voltage generated at the anode of the photocell $P_2$ after amplification by the amplifier $A_3$ corresponds to the voltage $E_7$ supplied by the battery B of FIGURE 1. In the system of FIGURE 5, the ratio of the signals generated by the two photocells $P_1$ and $P_2$ is employed to control the balance point of the pointer $T_4$ of the potentiometer P and to control the movement of the recording pen PN.

By use of a light chopper LC, the voltages generated at the anodes of the two phototubes $P_1$ and $P_2$ are periodic unidirectional voltages of trapezoidal or approximately rectangular configuration. In this case the periodic wave generated by the photocell $P_1$ is amplified by means of an A.C. amplifier $A_1$ and then passed through a switch demodulator SDM to produce a D.C. voltage which in turn is impressed upon the junction unit JU′.

The output of amplifier $A_1$ is impressed upon the switch demodulator SDM which acts as a full-wave rectifier, generating at its output a D.C. voltage proportional to the amplitude of the A.C. voltage impressed on its input. The output of the junction unit JU′ is then supplied to a switch modulator SM which converts the D.C. signal transmitted through the junction unit into a square-wave A.C. signal having an amplitude proportional to the magnitude of the D.C. signal. This A.C. signal is then impressed upon an A.C. amplifier $A_2$, the output of which is employed to drive an A.C. motor M. This motor in turn operates the generator G of the junction unit JU′ and also moves the slider $T_4$ of the potentiometer $P_1$ and the recording element PN of the recorder RC.

The junction unit JU′ of FIGURE 5 not only includes the generator G and a potential divider for determining the fraction of the generator output voltage which is fed back in the minor loop $L_2$, but also includes circuits which accomplish the filtering action of the filters $F_1$ and $F_2$ of the system of FIGURE 1. The amplifier $A_1$ has an amplification which may be varied by adjustment of the potential divider, or variable resistor, $R_{24}$. By its action in varying the gain of the amplifier $A_1$, adjustment of the value of the resistance $R_{24}$ serves to control damping of the system.

The filter section $F_1'$ is connected at the input of the junction unit JU′. This filter section includes a small resistor $R_{28}$ connected in series with a rheostat $R_{29}$ across a fixed resistance $R_{30}$. A shunting capacitor $C_4'$ is employed at the output of the filter $F_1'$ formed across the resistors $R_{28}$, $R_{29}$, $R_{30}$.

A second low-pass filter is connected between the output of the first low-pass filter $F_1'$ and the output of the junction unit JU'. This filter includes a series resistance formed by two variable resistors $R_{31}$ and $R_{32}$ which are connected in series.

The combined resistance formed by the resistors $R_{31}$ and $R_{32}$ is connected to opposite sides of the rate generator G through a variable resistor $R_{33}$ and a fixed resistor $R_{34}$. A capacitor $C_5$ is connected across the output of the generator and the resistance in order to filter out commutator noise produced by the generator. The shunt or output circuit of the second filter $F_2'$ comprises a fixed resistor $R_{36}$ and a capacitor $C_5'$ connected in series.

The switch demodulator SDM and the switch modulator SM are operated in synchronism with the light chopper LC in a conventional way. This result may be achieved, for example, by operating the switch demodulator SDM and the switch modulator SM from the same A.C. power source that drives the chopper motor M. In practice the switch demodulator is operated to switch on and off at the instant that the chopper segments enter and leave the light beam. Such a chopper, for example, may comprise two 90° opaque segments separated by 90° spaces and the switch demodulator may be operated to complete the circuit between the amplifier $A_1$ and the junction unit only during the transmission intervals of the chopper; that is, only while radiation is striking the phototubes $P_1$ and $P_2$.

The output of the junction unit JU' is impressed upon the switch modulator SM as stated before, thereby producing at the output of the switch modulator a square-wave alternating current signal having an amplitude proportional to the magnitude of the signal produced at the output of the junction unit JU'. In effect, the junction unit JU' forms a D.C. link between the switch demodulator unit SDM and the switch modulator SM.

It is not necessary for the switch modulator SM to operate at the same frequency as the switch demodulator SDM. In any event, the amplifiers $A_1$ and $A_2$ are A.C. amplifiers that are designed to operate over a band of frequencies that overlaps the carrier frequency corresponding to the switch demodulator and switch modulator frequencies, respectively.

The junction unit JU' of FIGURE 5 performs the feed back function of the junction unit JU of FIGURE 1 and also the filtering function of the filters $F_1$ and $F_2$ of FIGURE 1. In this case, however, the filters $F_1'$ and $F_2'$ are not isolated from the potential divider by isolation amplifiers $A_1''$ and $A_2'$ as are the filters $F_1$ and $F_2$ of FIGURE 1. For this reason, mathematical equations representing the response of the system of FIGURE 4 are not as simple as those which represent the action of the system of FIGURE 1. Nevertheless, the action of the servo-mechanism of FIGURE 5 is very similar to that mathematically described above for the system of FIGURE 1.

With the system of FIGURE 5, the cutoff of the filters $F_1'$ and $F_2'$ may be varied simultaneously without affecting the backlash and without requiring complex adjustments. With the system of FIGURE 5 the period of response of the system, which is $2\pi\tau$, may be varied over a wide range from about 0.5 sec. to about 50 sec. The manner in which various resistors are adjusted in order to accomplish various results in a particular system is briefly described below.

In adjusting and setting the values of the resistances, the values of the resistances $R_{28}$, $R_{29}$, $R_{31}$, $R_{32}$, $R_{33}$, $R_{34}$, and $R_{36}$, are first chosen to have values suitable for operation in the period range for the particular values of the gains of the amplifiers $A_1$ and $A_2$ and the particular characteristics of the motor M and generator G.

In one such system, the maximum gains of the variable gain amplifiers $A_1$ and $A_2$ were $$A_1=\frac{E_3}{E_0}=500$$

$$A_2=\frac{E_5}{E_4}=80,000$$

though the actual amplification factors actually used after adjustment of the circuit constants were $$A_1=38$$
$$A_2=40,000$$

It is to be noted that the signals applied to the input of amplifier A' are subtracted at the input of this amplifier and that it is the resultant difference that is variably amplified.

The motor was the motor component of a motor-generator of Type FPE–25–84–2 supplied by Diehl Manufacturing Company, Sommerville, New Jersey.

In employing this motor-generator the reference winding was supplied with 60 cycle A.C. power at 115 volts. The control winding was connected to the output of the amplifier $A_2$. The switch modulator SM was designed to cause the output voltage of the amplifier $A_2$ to be 90° out of phase with the voltage supplied to the reference winding.

The D.C. generator forming the generator component of this unit produced an output of 6.5 volts D.C. at 1,000 r.p.m.

In that system, the values selected for the resistors and capacitors were as follows:

$R_{28}=1800\ \omega$
$R_{29}$=variable up to 2.5M
$R_{30}$=680K
$R_{31}$=variable up to 2.5M
$R_{32}$=variable up to 10K
$R_{33}$=variable up to 1M
$R_{34}$=1K
$C_4'=10\ \mu f.$
$C_5'=10\ \mu f.$
$R_{36}$=12K where $\omega$, k, and M are ohms, kilohms, and megohms, respectively. The resistors $R_{29}$ and $R_{31}$ which are ganged, are operated by a single control which is calibrated to read in values of response period.

As indicated, the variable resistors $R_{29}$ and $R_{31}$ are ganged together, the two resistors having the same values at all times. By varying these two resistors simultaneously, the over-all effective response period $2\pi\tau$ of the entire system is changed over wide limits from, say, under 0.5 sec. to over 50 sec.

The values of $R_{28}$ and $R_{32}$ determine the minimum time constant of the system and the damping characteristics of the system when operating with the fastest response. Such a minimum time constant applies where the variable resistors $R_{29}$ and $R_{31}$ are set at their zero values. The resistor $R_{33}$ is employed to control the damping characteristic of the system at an intermediate time constant setting.

In one way of adjusting the system, the gain of the amplifier $A_2$ is set at some arbitrary high value such as 60,000 but, of course, below the point where instability occurs. When the gain of amplifier $A_2$ is thus set, the value of resistor $R_{32}$ is set at its intermediate value and the resistors $R_{29}$ and $R_{31}$ are set at their values that correspond to a response period of 50 sec. Then starting with the amplification $A_1$ at a low value, this amplification is increased by manipulation of the resistor $R_{24}$ to the point where slight overshooting appears in the output. When this occurs, the value of the resistor $R_{24}$ is reduced slightly to avoid such overshooting and to a point, however, where the damping is still satisfactory.

Such testing of the response of the system may be made in several ways. For example, it may be made by driving the scanning unit at slow speed and noting the response of the system as indicated by the record made by the pen PN. Such testing may also be made by simply inserting an opaque object between the exit slit and the phototube $P_1$. This corresponds to introducing a step-function at the input of the amplifier $A_0$.

In either event, by examining the resultant record produced by movement of the recording pen PN while the recording paper RP is being advanced, it may be determined whether the system is under-damped, critically damped, or over-damped, especially when a series of tests are made with different damping.

Figure 6:
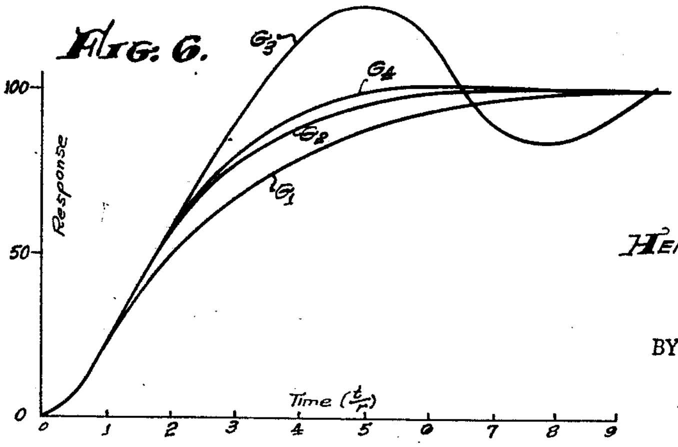
FIG. 6 is a graph employed in explaining the invention.

Various types of response characteristics that may be obtained under various conditions during such a test are illustrated in FIGURE 6. In this figure, graph $G_1$ represents the output of an over-damped system. Graph $G_2$ represents the response of a critically damped system. Graph $G_3$ represents the output of a very much under-damped system, and graph $G_4$ represents the output of an ideally damped system. Ordinarily, the term "critical damping" is employed to describe a system of the second order. However, the term is used more broadly here to indicate the damping condition that applies when the damping is just enough to prevent overshooting, regardless of the order. In a second order system, better response than that obtained with critical damping may be achieved by employing about 90 percent of critical damping. The same applies in the higher-than second-order system described herein.

In any system, ideal damping occurs when the first peak that occurs in the output overshoots the ultimate value by an amount equal to the tolerable error. In order to produce a system in which the output signal has a very short rise time or rapid response without significant overshooting, the damping is set between about ideal damping and about critical damping. Such damping is, for convenience, referred to herein as optimal damping.

Thus, after the equipment has been tested by manipulation of the resistor $R_{24}$ to determine the point where overshooting occurs, the value of the resistor $R_{24}$ is reduced to the point where optimal damping exists. With the gain of the amplifier $A_1$ thus set at a value corresponding to the optimal damping for a response period of 50 sec., the gain of the amplifier $A_1$ is then adjusted to produce satisfactory backlash. Sometimes, but infrequently, when $A_2$ is so adjusted, the resistance of the resistor $R_{24}$ must be adjusted again in order to produce optimal damping. If $A_1$ is changed much, $A_2$ is again adjusted to produce satisfatcory backlash.

The values of the resistors $R_{29}$ and $R_{31}$ are then set at positions which correspond to a response period of about 5 sec. that is, they are set at points which correspond to time constant $\tau$, and $\tau_2$ of about 0.4 sec. in their individual filter circuits $F_1'$ and $F_2'$, respectively. With the resistors $R_{29}$ and $R_{31}$ so set, the value of the resistor $R_{33}$ is then adjusted to produce optimal damping. When this adjustment has been completed the values of the resistors $R_{29}$ and $R_{31}$ are again set at the positions corresponding to a 50 sec. period and the resistor $R_{24}$ is again adjusted to produce optimal damping.

The values of the resistors $R_{29}$ and $R_{31}$ are then set at lower values corresponding to a very low response period of about 0.5 sec. When so set, the value of the resistor $R_{32}$ is adjusted to produce optimal damping.

Having set the various resistors of the junction unit JU' at various values to produce optimal damping at three widely separated points throughout the range of operation, it is found that optimal damping is produced throughout the entire range of operation even though the period of response is changed only by varying the ganged resistors $R_{29}$ and $R_{31}$. The simple control provided with this arrangement makes it possible to vary the response period of the system by changing only two resistors. By virtue of the specific circuit used, changing the value of the resistor $R_{31}$ not only changes the value of the time constant $\tau_2$ of the filter $F_2'$ but simultaneously changes the fraction of the output of the generator G which is balanced against the output of the first filter $F_1'$.

The natural time constant of the motor-generator described above is about 0.2 sec. Though this time constant is somewhat larger than the lowest time constant of the system, this does not interfere with the rapid action of the system.

The particular motor-generator employed in the system just described requires the application of about 30 volts to the control winding in order to produce sufficient torque to start. With the system operating in its normal manner, the total voltage applied to the control winding seldom exceeds 300 or 400 volts. In spite of this, the overall system is characterized by a backlash or "dead zone" which is less than one-fifth of one percent full scale reading. As indicated above, the permissible error or tolerance varies inversely as the product $A_1A_2$ of the gains of the two amplifiers. It is also proportional to the motor starting voltage, which in this case is 30 volts.

In the system described, the value of the constant K of FIGURES 4A and 4B is proportional to the response period of the system. The amount of signal fed back from the generator to the input of the minor loop $L_2$ also increases with the response. The attenuation at high frequencies where instability of the system might occur, also increases with the response period. Thus, the attenuation at high frequencies is great under the condition where such attenuation is needed most to prevent instability.

Ideally, if a quartic response characteristic is to be maintained with critical damping, it would also be necessary to vary the gain of the amplifier $A_2$. However, this mathematical requirement does not, in practice, need to be met in order to produce a system in which optimal damping is produced over a wide range of response periods as described above. In the present system $A_2$ has been made so large that $g_2$ is very small, thus achieving optimal damping of the second order type as represented by Equation 14. The use of two variable filters makes it possible to maintain the minor loop stable as the response period of the system changes.

The foregoing system may be readily operated with different response times by simply shifting the gears of the variable high speed transmission TR and by manipulating the single knob that controls the two variable resistors $R_{29}$ and $R_{31}$. In practice, when small signals are to be detected or measured, a slow scanning speed and a long value of $\tau$ are employed, but when large signals are to be detected or measured, a high scanning speed and a short value of $\tau$ may be employed.

It will be understood, of course, that the invention may be employed to many different forms than that described herein. More particularly it will be understood that it is not necessary for the various components to be linear nor is it necessary that they have the specific form described herein. It will, therefore, be understood that many changes may be made in the forms characteristic of the various parts and in their arrangement without departure from the scope of the invention as defined by the following claims.

The invention claimed is:

1. In a servo-mechanism unit in which an output signal generated in accordance with the movement of a slave element driven by a servo-motor is balanced against an input signal generated by a master element: first and second amplifying means connected in sequence between an input to which said input signal is applied and said motor and forming therewith a part of a first, or major, servo loop for balancing said output signal against said input signal;

a junction unit connected between said first and second amplifying units and including a generator driven by said motor, said generator being characterized by developing a signal which varies with the speed of said motor, said generator, said second amplifying means, and said motor being connected in a second, or minor, servo loop, said generator applying said signal to the input of said second amplifying unit;

a low-pass filter connected between said input and said second amplifying means but outside of said second loop;

and a second low-pass filter connected in said second servo loop.

2. In a servo-mechanism unit in which an output signal generated in accordance with the movement of a slave element driven by a servo-motor is balanced against an input signal generated by a master element: first and second amplifying means connected in sequence between an input to which said input signal is applied and said motor and forming therewith a part of a first, or major, servo loop for balancing said output signal against said input signal;

a junction unit connected between said first and second amplifying units and including a generator driven by said motor, said generator being characterized by developing a signal which varies with the speed of said motor, said generator, said second amplifying means, and said motor being connected in a second, or minor, servo loop said generator applying said signal to the input of said second amplifying unit;

a first low pass filter connected between said input and said second amplifying means but outside of said second loop;

and a second low-pass filter in said second servo loop, said second low-pass filter producing a phase shift less than 90° at all frequencies.

3. In a servo-mechanism unit in which an output signal generated in accordance with the movement of a slave element driven by a servo-motor is balanced against an input signal generated by a master element comprising: first and second variable gain amplifying means connected in sequence between an input to which said input signal is applied and said motor and forming therewith a part of a first, or major, servo loop for balancing said output signal against said input signal;

a junction unit connected between said first and second amplifying units and including a generator driven by said motor, said generator being characterized by developing a signal which varies with the speed of said motor, said motor, said generator, said second amplifying means, and said motor being connected in a second, or minor, servo loop;

a variable low-pass filter connected between said input and said second amplifying means but outside of said second loop;

a variable second low pass filter connected in said second servo loop;

and means for adjusting the fraction of said generator signal that is fed back in said second servo loop.

4. In a servo-mechanism unit in which an output signal generated in accordance with the movement of a slave element driven by a servo-motor is balanced against an input signal generated by a master element: first and second amplifying means connected in sequence between an input to which said input signal is applied and said motor and forming therewith a part of a first, or major, servo loop for balancing said output signal against said input signal;

a junction unit connected between said first and second amplifying units and including a generator driven by said motor, said generator being characterized by developing a signal which varies with the speed of said motor, said generator, said second amplifying means, and said motor being connected in a second, or minor, servo loop;

a low-pass filter connected between said input and said second amplifying means but outside of said second loop;

a second low-pass filter connected in said second servo loop;

and means for adjusting the time constants of said two low-pass filters and for simultaneously varying the fraction of said generator voltage fed back in said second servo loop.

5. In a servo-mechanism unit in which an output signal generated in accordance with the movement of a slave element driven by a servo-motor is balanced against an input signal generated by a master element; first and second amplifying means connected in sequence between an input to which said input signal is applied and said motor and forming therewith a part of a first, or major, servo loop for balancing said output signal against said input signal;

a junction unit connected between said first and second amplifying units and including a generator driven by said motor, said generator being characterized by developing a signal which varies with the speed of said motor, said generator, said second amplifier, and said motor being connected in a second, or minor, servo loop;

a low-pass filter connected between said input and said second amplifier but outside of said second loop;

a second low-pass filter connected in said second servo loop, means for adjusting the time constant of said first low-pass filter;

means for adjusting the time constant of said second low-pass filter and for simultaneously varying the attenuation of said second low-pass filter at frequencies above the cutoff frequency thereof as a direct function of said time constant;

and means for changing the fraction of said generator voltage fed back in said second servo loop.

6. In a servo-mechanism unit in which an output signal generated in accordance with the movement of a slave element operated by a servo-motor is balanced against an input signal generated by a master element and in which said input signal is generated by a scanning system: first and second amplifying means connected in sequence between an input to which said input signal is applied and said motor and forming therewith a part of a first, or major, servo loop for balancing said output signal against said input signal;

a junction unit connected between said first and second amplifying units and including a generator driven by said motor, said generator, said second amplifying means, and said motor being connected in a second, or minor, servo loop, said generator being characterized by developing a signal which varies with the speed of said motor;

a low-pass filter connected between said input and said second amplifying means but outside of said second loop;

a second low-pass filter connected in said second servo loop;

means for altering the rate at which said scanning system operates to generate said input signal;

means for changing the time constants of said low-pass filters;

and means for changing the fraction of said generator voltage that is fed back in said second servo loop.

7. In a self-balancing unit in which a feed-back signal generated by a servo-mechanism is balanced against a source signal and in which the difference between said signals is employed to generate said feed-back signal:

a two-stage filter circuit having an input and an output comprising first and second low-pass filter sections connected in cascade between said input and said output, said first low-pass filter section including a series resistance element and a D.C.-open shunt circuit comprising a capacitor, said second low-pass filter section including a series resistor and a D.C. open shunt circuit comprising a shunt resistor and a second capacitor connected in series;

means for applying said signal difference to said filter circuit input;

means including a generator controlled by said filter circuit output for applying an auxiliary feed-back signal to said filter circuit at a point between said two filter sections to oppose the transmission of signals from said filter circuit input to said filter circuit output;

and means also controlled by said filter circuit output for generating said first mentioned feed-back signal.

8. In a self-balancing unit in which a feedback signal generated by a servo-mechanism is balanced against a source signal, and in which the difference between said signals is employed to generate said feed-back signal:

a two-stage filter circuit having an input and an output and comprising first and second low-pass filter sections connected in cascade between said input and said output, said first low-pass filter section including a first series resistor and a D.C.-open shunt circuit comprising a capacitor, said second low-pass filter section including a second series resistor and a D.C.-open shunt circuit comprising a shunt resistor and a second capacitor connected in series;

means for applying said signal difference to said filter circuit input;

a generator operated by said filter circuit output;

a potential divider including said second series resistor connected across the output of said generator for applying an auxiliary feed-back signal to said filter circuit at a point between said two filter sections to oppose the transmission of signals from said filter circuit input to said filter circuit output;

and means also controlled by said filter circuit output for generating said first mentioned feed-back signal.

9. A self-balancing unit as defined in claim 8 in which said second series resistor is variable whereby both the response time of said second low-pass filter section and the magnitude of said auxiliary feed-back signal may be varied simultaneously.

10. In a servo-mechanism unit in which an output signal generated in accordance with the movement of a slave element is balanced against an input signal generated by a master element to provide a difference signal:

first and second amplifying means connected in sequence between an input to which said difference signal is applied and an output at which said output signal is developed, and forming therewith part of a first, or major, servo-loop for balancing the output signal against said input signal;

and a junction unit connected between said first and second amplifying units, said junction unit comprising a two-stage filter circuit having an input connected to the output of said first amplifier and an output connected to the input of said second amplifying means, said two-stage filter circuit comprising first and second low-pass filter sections connected in cascade between the input and the output of said two-stage filter circuit, said first low-pass filter section including a series resistance element and a D.C.-open shunt circuit comprising a capacitor, said second low-pass filter section including a second variable series resistor and a D.C.-open shunt circuit comprising a shunt resistor and a shunt capacitor connected in series;

a generator operated by the output of said second amplifying means for developing a voltage that increases as a function of the voltage in the output of said second amplifying means;

a potential divider including said second series resistor connected across the output of said generator for applying an auxiliary feed-back signal to said filter circuit at a point between said two filter sections to oppose the transmission of signals from said filter circuit input to said filter circuit output; and means also controlled by the output of said second amplifying means for generating first mentioned feed back signal.

11. A servo-mechanism as defined in claim 10 in which the gain of said first amplifying means is adjustable.

12. A servo-mechanism as defined in claim 10 in which said two series resistors are ganged together.

13. In a servo-mechanism unit in which an output signal generated in accordance with the movement of a slave element is balanced against an input signal generated by a master element to provide a difference signal:

first and second amplifying means connected in sequence between an input to which said difference signal is applied and an output at which said output signal is developed, and forming therewith part of a first, or major, servo-loop for balancing the output signal against said input signal;

means for adjusting the gain of each of said amplifying means;

and a junction unit connected between said first and second amplifying units, said junction unit comprising a two-stage filter circuit having an input connected to the output of said first amplifier and an output connected to the input of said second amplifying means, said two-stage filter circuit comprising first and second low-pass filter sections connected in cascade between the input and the output of said two-stage filter circuit, said first low-pass filter section including a variable series resistance element and a D.C.-open shunt circuit comprising a capacitor, said second low-pass filter section including a second variable series resistor and a D.C.-open shunt circuit comprising a shunt resistor and shunt capacitor connected in series, said variable resistors being ganged together;

a generator operated by the output of said second amplifying means for developing a voltage that increases as a function of the voltage in the output of said second amplifying means;

a potential divider including said second series resistor connected across the output of said generator for applying an auxiliary feed-back signal to said filter circuit at a point between said two filter sections to oppose the transmission of signals from said filter circuit input to said filter circuit output; and means also controlled by the output of said second amplifying means for generating first mentioned feed-back signal;

14. In a unit as defined in claim 6:

means driven by said scanning system for moving a recording medium past a recording position; and means driven by said motor for moving a recording element transversely of the direction of motion of said recording medium to a position displaced from a reference position by an amount corresponding to the magnitude of said input signal.

15. In a unit as defined in claim 6:

means supporting a display medium; and means controlled by said scanning system and by said servo-motor for generating on said display medium a graph representative of the manner in which said input signal varies during the scanning operation.

16. In combination with a source providing a first signal that is to be measured:

an amplifier having first and second inputs;

a periodically operated signal chopper arranged to periodically interrupt said first signal and to apply said interrupted signal to said first amplifier inputs;

a potentiometer connected to apply a second signal of adjustable magnitude to said other amplifier inputs;

a switch demodulator connected to the output of said amplifier and driven in synchronism with said signal chopper for converting a pulsating signal appearing in said output to a D.C. signal that corresponds in magnitude with the difference in amplitudes of signals applied to said amplifier inputs;

a two-stage filter circuit having an input and an output and comprising first and second low-pass filter sections connected in cascade between said filter input and said filter output, said first low-pass filter section including a series resistance element and a D.C.-open shunt circuit comprising a capacitor, said second low-pass filter section including a series resistor and a D.C.-open shunt circuit comprising a shunt resistor and a second capacitor connected in series;

means including a generator controlled by the output of said filter circuit for applying an auxiliary feed-back signal to said filter circuit at a point between said two filter sections to oppose the transmission of signals from said filter circuit input to said filter circuit output; and means also controlled by the output of said filter circuit for setting said potentiometer to reduce the difference between the amplitudes of the signals applied to said amplifier inputs.

17. In combination with a source providing a first signal that is to be measured:

an amplifier having first and second inputs;

a periodically operated signal chopper arranged to periodically interrupt said first signal and to apply said interrupted signal to said first amplifier inputs;

a potentiometer connected to apply a second signal of adjustable magnitude to said other amplifier inputs;

a switch demodulator connected to the output of said amplifier and driven in synchronism with said signal chopper for converting a pulsating signal appearing in said output to a D.C. signal that corresponds in magnitude with the difference in amplitudes of signals applied to said amplifier inputs;

a periodically operated switch modulator;

a servo motor connected to the output of said switch modulator;

a D.C. link connected between the output of said switch demodulator and the input of said switch modulator, said D.C. link comprising:

a two-stage filter circuit having an input and an output and comprising first and second low-pass filter sections connected in cascade between said filter circuit input and said filter circuit output, said first low-pass filter section including a series resistance element and a D.C.-open shunt circuit comprising a capacitor, said second low-pass filter section including a series resistor and a D.C.-open shunt circuit comprising a shunt resistor and a second capacitor connected in series;

means including a generator controlled by said servo motor for applying an auxiliary feed-back signal to said filter circuit at a point between said two filter sections to oppose the transmission of signals from said filter circuit input to said filter circuit output;

and means also controlled by said servo motor for operating said potentiometer to reduce the difference between the amplitudes of the signals applied to said amplifier inputs.

18. In the combination defined by claim 16 comprising means controlled in accordance with the setting of said potentiometer for indicating the amplitude of said first signal.

19. In combination with a spectrometer employing a source of radiation and a photocell and employing a dispersion unit for directing radiation of selected wave length to said photocell after being modified by a sample under investigation, the combination therewith of:

a light chopper driven by a motor and arranged to periodically interrupt the transmission of radiation to said photocell whereby said photocell provides a periodically chopped voltage having an amplitude indicative of the intensity of the radiation of selected wavelength reaching said photocell;

an amplifier having first and second inputs;

means for applying the output of said photocell to said first amplifier input;

a potentiometer for applying a voltage of adjustable magnitude to said other amplitude input;

a switch demodulator connected to the output of said amplifier for converting a pulsating signal appearing in the output thereof to a D.C. signal;

a motor operating said light chopper and said switch demodulator in synchronism so as to produce at the output of said switch demodulator a D.C. voltage proportional to the difference between the amplitudes of the voltages applied to said amplifier inputs;

a periodically operated switch modulator;

a servo motor connected to the output of said switch modulator;

a D.C. link connected between the output of said switch demodulator and the input of said switch modulator, said D.C. link comprising;

a two-stage filter circuit having an input and an output and comprising first and second low-pass filter sections connected in cascade between said filter circuit input and said filter circuit output, said first low-pass filter section including a series resistance element and a D.C.-open shunt circuit comprising a capacitor, said second low-pass filter section including a series resistor and a D.C.-open shunt circuit comprising a shunt resistor and a second capacitor connected in series;

means including a generator controlled by said servo motor for applying an auxiliary feed-back signal to said filter circuit at a point between said two filter sections to oppose the transmission of signals from said filter circuit input to said filter circuit output; and means controlled by said servo motor for operating said potentiometer to reduce the difference between the amplitudes of the signals applied to said amplifier inputs.

References Cited in the file of this patent

UNITED STATES PATENTS

| | | |
|---|---|---|
| 2,817,769 | Siegler et al. | Dec. 24, 1947 |
| 2,913,654 | Clark | Nov. 17, 1959 |

OTHER REFERENCES

Servomechanism Practice, Ahrend, W. R., FIGS. 7–13, pp. 111 and 87, McGraw-Hill, New York, 1954.

Greenwood Holdam and MacRae, Electronic Instruments, McGraw-Hill, New York, 1948, pp. 359–361.